(12) United States Patent
Schmid et al.

(10) Patent No.: US 7,644,441 B2
(45) Date of Patent: Jan. 5, 2010

(54) METHODS FOR IDENTIFYING MALICIOUS SOFTWARE

(75) Inventors: Matthew N. Schmid, Reston, VA (US); Michael Weber, Brookline, MA (US); Michael Haddox-Schatz, Newport News, VA (US); David Geyer, Sterling, VA (US)

(73) Assignee: Cigital, Inc., Dulles, VA (US)

( * ) Notice: Subject to any disclaimer, the term of this patent is extended or adjusted under 35 U.S.C. 154(b) by 680 days.

(21) Appl. No.: 10/948,147

(22) Filed: Sep. 24, 2004

(65) Prior Publication Data

US 2005/0223238 A1 Oct. 6, 2005

Related U.S. Application Data

(60) Provisional application No. 60/505,871, filed on Sep. 26, 2003.

(51) Int. Cl.
- *G08B 23/00* (2006.01)
- *G06F 11/30* (2006.01)
- *G06F 12/14* (2006.01)

(52) U.S. Cl. .......................... 726/24; 713/188; 714/38

(58) Field of Classification Search ................. 726/24; 713/188; 714/38
See application file for complete search history.

(56) References Cited

U.S. PATENT DOCUMENTS

| | | | | |
|---|---|---|---|---|
| 5,452,442 A * | 9/1995 | Kephart | .................. | 714/38 |
| 6,006,329 A * | 12/1999 | Chi | ............................... | 726/24 |
| 6,021,510 A * | 2/2000 | Nachenberg | .................. | 714/38 |
| 6,253,337 B1 * | 6/2001 | Maloney et al. | ................ | 714/38 |
| 6,971,019 B1 * | 11/2005 | Nachenberg | ................ | 713/188 |
| 2002/0066034 A1 * | 5/2002 | Schlossberg et al. | ......... | 713/201 |
| 2002/0078368 A1 * | 6/2002 | Yann et al. | .................... | 713/200 |
| 2003/0065926 A1 * | 4/2003 | Schultz et al. | .............. | 713/188 |
| 2003/0212913 A1 * | 11/2003 | Vella | ........................... | 713/202 |
| 2004/0143753 A1 * | 7/2004 | Hernacki et al. | ............. | 713/200 |

OTHER PUBLICATIONS

Geyer, David et al. "A Toolkit for Detecting and Analyzing Malicious Software", Proceedings of the 18th Annual Computer Security Applications Conference (ACSAC'02), Dec. 9-13, 2002.*
Garnett, Paul D. "Selective Disassembly: A First Step Towards Developing A Virus Filter", 1988.*

* cited by examiner

*Primary Examiner*—Michael J Simitoski
(74) *Attorney, Agent, or Firm*—Edell, Shapiro & Finnan, LLC

(57) ABSTRACT

Malicious software is identified in an executable file by identifying malicious structural features, decryption code, and cryptographic functions. A malicious structural feature is identified by comparing a known malicious structural feature to one or more instructions of the executable file. A malicious structural feature is also identified by graphically and statistically comparing windows of bytes or instructions in a section of the executable file. Cryptography is an indicator of malicious software. Decryption code is identified in an executable file by identifying a tight loop around a reversible instruction that writes to random access memory. Cryptographic functions are identified in an executable file be obtaining a known cryptographic function and performing a string comparison of the numeric constants of the known cryptographic function with the executable file.

25 Claims, 7 Drawing Sheets

METHODS FOR IDENTIFYING MALICIOUS SOFTWARE

CROSS-REFERENCE TO RELATED APPLICATION

This application claims the benefit of U.S. Provisional Patent Application Ser. No. 60/505,871 filed Sep. 26, 2003, which is herein incorporated by reference in its entirety.

BACKGROUND OF THE INVENTION

1. Field of the Invention

Embodiments of the present invention relate to methods for detecting malicious software. More particularly, embodiments of the present invention relate to methods for detecting malicious software based on properties of the programs that host the malicious software.

2. Background Information

Malicious software ("malware") remains a major threat to today's information systems. Examples of malware include but are not limited to viruses, Trojan horses, and worms. Detecting and analyzing dangerous programs is a costly and often inaccurate endeavor. The difficulty of this task is underscored by a recent contest challenging participants to figure out the nefarious behavior of a particular program that has already been determined to be malicious in nature. Often identifying a program (or portion thereof) as malicious is half of the battle.

An important area of investigation is the detection of malicious software that has been attached to an otherwise benign host application. This is the modus operandi for many of the most common forms of malware including executable viruses and many Trojan horse programs. The host program provides cover while the virus or Trojan horse performs malicious actions unbeknownst to the user. These programs often propagate while attached to games or other enticing executable files.

Malicious programmers have demonstrated their creativity by developing a great number of techniques through which malware can be attached to a benign host. Several insertion methods are common, including appending new sections to an executable, appending the malicious code to the last section of the host, or finding an unused region of bytes within the host and writing the malicious content there. A less elegant but effective insertion method is to simply overwrite parts of the host application.

Given the myriad ways malicious software can attach to a benign host it is often a time-consuming process to even locate the point of infection. Traditional tools including disassemblers and debuggers may be useful for examining malware once it has been located, but provide little help in guiding an analyst to the malicious software in the first place. Malicious software that hides in a data section or other unexpected location may be particularly difficult to identify. To make matters worse, the total code size of a malicious program is frequently orders of magnitude smaller than the host that it infects.

Also, malicious software detection is theoretically unsolvable. This has much to do with the subtlety of what constitutes malicious code and what constitutes an "honest bug." For example, a programmer may inadvertently code a program that contains a buffer over-run. This is an "honest bug" due to a programming error. A different user may construct the exact same source code knowing full well that there is a buffer over-run. This same user may later exploit the buffer overflow to gain unauthorized access to systems. Thus, an algorithm to decide maliciousness cannot be developed for the most general case.

It has been proven that deciding whether or not an arbitrary program is infected with an arbitrary virus is "Turing Undecidable." This result is intimately related to the "Halting Problem in Computability Theory" that states that there does not exist a Turing Machine that can decide whether or not an arbitrary Turing Machine will halt on all inputs or not. The proof of this is utilizes a Cantor diagonalization argument.

In view of the foregoing, it can be appreciated that a substantial need exists for methods that can advantageously aid an analyst in determining if a program contains malicious code.

BRIEF SUMMARY OF THE INVENTION

One embodiment of the present invention is a method for identifying malicious software in an executable file by comparing a known malicious software feature to the executable file's instructions. The executable file is disassembled into one or more instructions. In the one or more instructions, a first instruction that calls a second instruction, where the second instruction immediately follows the first instruction, is located. The first instruction and the second instruction are identified as the malicious software.

Another embodiment of the present invention is a method for identifying malicious software in an executable file by graphically comparing a structural feature of the executable file across windows of bytes in a section of the executable file. A section of the executable file is divided into a plurality of windows, each window of the plurality of windows containing one or more bytes. A transformation function is applied to the one or more bytes of the plurality of windows that provides a numerically comparable value for each window. Finally, the numerically comparable value for each window is displayed as a function of each window.

Another embodiment of the present invention is a method for identifying malicious software in an executable file by statistically comparing a structural feature of the executable file across windows of instructions in a section of the executable file. A section of the executable file is dissembled into instructions. The section of the executable file is divided into a plurality of windows, each window of the plurality of windows containing one or more instructions. A transformation function is applied to the one or more instructions of the plurality of windows that provides a numerically comparable value for each window and results in a list of numerically comparable values for the plurality of windows. It is determined if a value from the list of numerically comparable values is a statistical outlier with respect to other values from the list. Finally, if a value is a found to be a statistical outlier, the window containing the value is identified as malicious software.

Cryptography is often employed in the design of malicious software. As a result, locating cryptographic code is employed as a method of locating malicious software. Another embodiment of the present invention is a method for identifying decryption code in an executable file. A portion of the executable file is disassembled into a series of instructions. The series of instructions is searched for a reversible instruction. A first group of instructions that immediately follow the reversible instruction is analyzed for a jump instruction that sends control to a jump location in a second group of instructions that immediately precede the reversible instruction. An instruction that writes to random access memory is located in the series of instructions between the jump location and the jump instruction. Finally, a group of instructions in the series between the jump location and the jump instruction is identified as decryption code.

Another embodiment of the present invention is a method for identifying a cryptographic function in an executable file. A known cryptographic function implementation containing one or more numeric constants is obtained. A string comparison of the one or more numeric constants with the executable file is performed. Finally, the portion of the executable file matching of the one or more numeric constants is identified as the cryptographic function.

Figure 1:
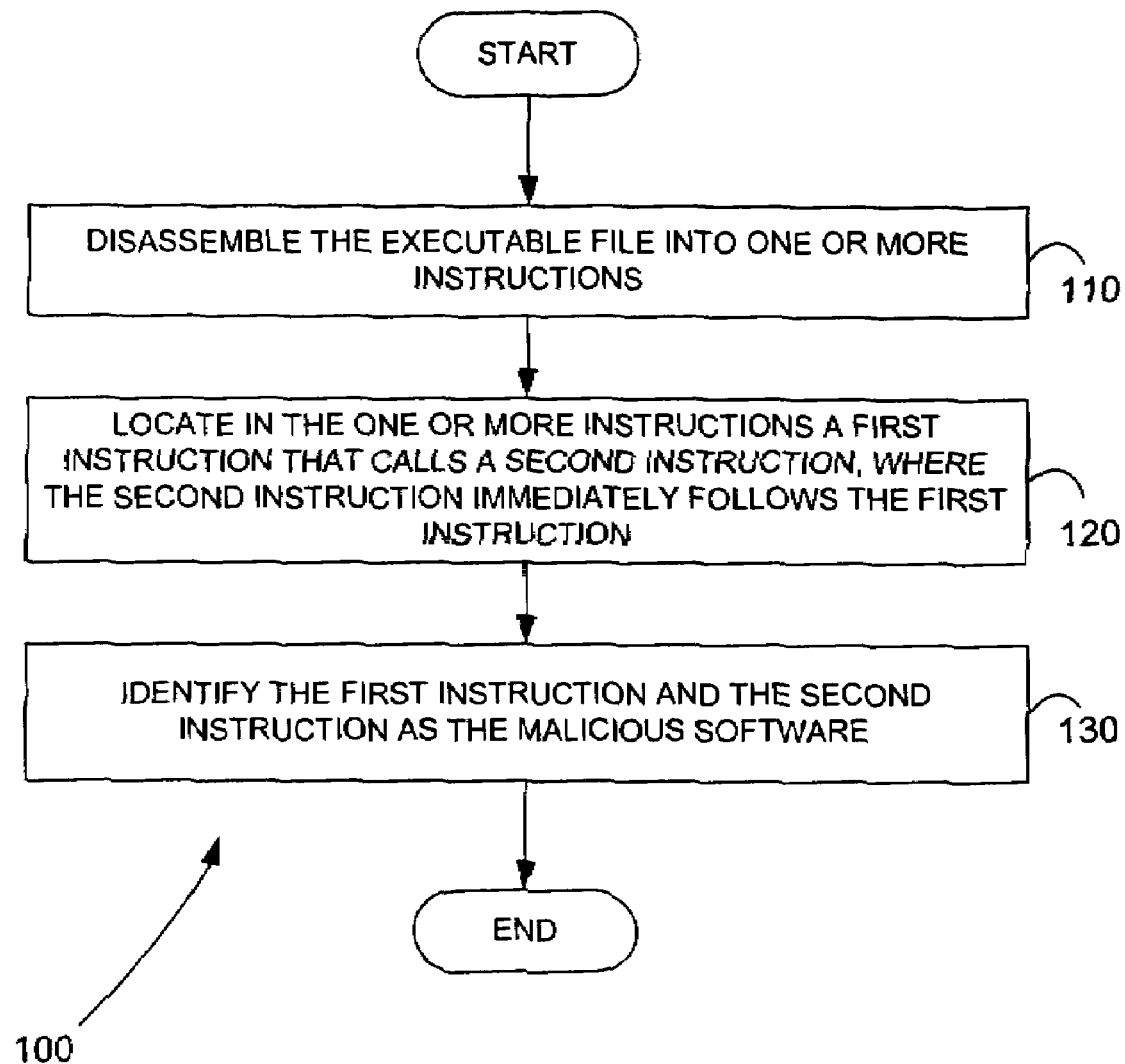
FIG. 1 is a flowchart showing a method for identifying malicious software in an executable file by comparing a known malicious software feature to the executable file's instructions, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of this invention differ from previous approaches to the malicious code problem, because they do not attempt to define or identify malicious behavior. Instead, they focus on structural characteristics of malicious executable code. These embodiments provide methods to examine any application, whether previously known or unknown, in order to determine if it has been tampered with since its original creation. Such tampering usually takes the form of an embedded virus or Trojan horse that is activated during subsequent executions of the executable program.

I. Identification of Inhomogeneous Regions of Binaries

One embodiment of the present invention provides an analyst with an array of tools to identify inhomogeneous regions of binaries within a host program. These tools are designed to locate structural features of executables that do not fit in with surrounding regions; i.e., regions of bytes that appear to have been inserted into an otherwise homogeneous binary file. The underlying premise is that programs are typically compiled into one consistent binary. Any deviation from this self-consistency is a strong indicator of tampering. The program may be infected with a virus or worm, it could contain a Trojan horse program, or it could have been modified in some other manner resulting in a program whose behavior is different from the intended behavior of the original program.

A method of identifying inhomogeneous regions of binaries within a host program is divided into three categories: simple static checks, visualization tools, and automated statistical analysis.

Simple static checks consist of a list of features whose presence or absence the method attempts to verify in order to quickly gain information that might suggest something suspicious. For example, the method immediately issues a warning if the program's entry point is in an unusual location.

Visualization tools include graphical depictions of several features of the executable that is being analyzed. Examples of these include: (1) probabilities that a region of bytes in the executable contain code, padding, ASCII data, or random byte values; (2) address offsets for instructions that perform operations such as jumps, calls, or register accesses; and (3) patterns of instructions that are known to indicate certain behavior (i.e., pushing arguments onto the stack and making a call).

The visualization toolkit also uses the method's disassembler to parse and decode instructions. The user may then view the disassembly listing. In addition, in order to identify ASCII strings, the user may view the ASCII representation of all byte values within a given region. Together, these visualization tools are intended to allow an expert analyst to explore an executable file in an attempt to identify regions that appear to be inconsistent with the entire program. To complement these manual analysis capabilities, the method also provides automated analysis tools to guide the analyst to suspicious regions of the executable file.

The method's automated analysis tools perform statistical tests to detect anomalous regions. The analysis operates on many of the same executable file characteristics as the visualization tools. The user chooses which features to consider, and the analysis engine will then divide the executable file sections into several regions and determine whether there are any statistically significant differences between those regions. Each anomaly that is found is reported and stored as a suspect region, along with automatically generated comments describing why it stands out.

A. Static Checks

FIG. 1 is a flowchart showing a method 100 for identifying malicious software in an executable file by comparing a known malicious software feature to the executable file's instructions, in accordance with an embodiment of the present invention. Method 100 attempts to identify "bogus calls", which are defined to be instructions that call to the immediately following instruction. Such a sequence of instructions is a common method that viruses use to determine their address in memory. For example, in MS WINDOWS™ machines, this is because the value of the instruction pointer register EIP gets pushed onto the stack as a side effect of a call instruction. Viruses often exploit this by immediately popping this value. Because of the suspicious nature of such instruction sequences, method 100 alerts the user to their presence after the executable file has been disassembled.

In step 110 of method 100, the executable file is disassembled into one or more instructions.

In step 120, a first instruction that calls a second instruction, where the second instruction immediately follows the first instruction, is located in the one or more instructions.

In step 130, the first instruction and the second instruction are identified as the malicious software.

Additional static checks of the executable file under analysis are performed to quickly gain information that might suggest that it contains something suspicious. The first of these is a check on the program's entry point address, obtained from the executable file header. This address should fall within some section that is marked as executable (In MS WINDOWS™, this will typically be the first section, and named .text or CODE). If this is not the case, for example, if the entry point lies in another section that should not contain executable code, a warning will be issued once the executable file is loaded.

Another static check determines which dynamically linked libraries are listed in the executable file's import table and reports the name and contents of each. In addition, it finds all instructions in the program that call a function in a dynamically linked library and reports the locations of those instructions, along with the library and function name. This is a quick initial pass at determining whether the program has any unexpected capabilities, such as file or network I/O in an application that should not require that functionality.

B. Visualization Tools

Figure 2:
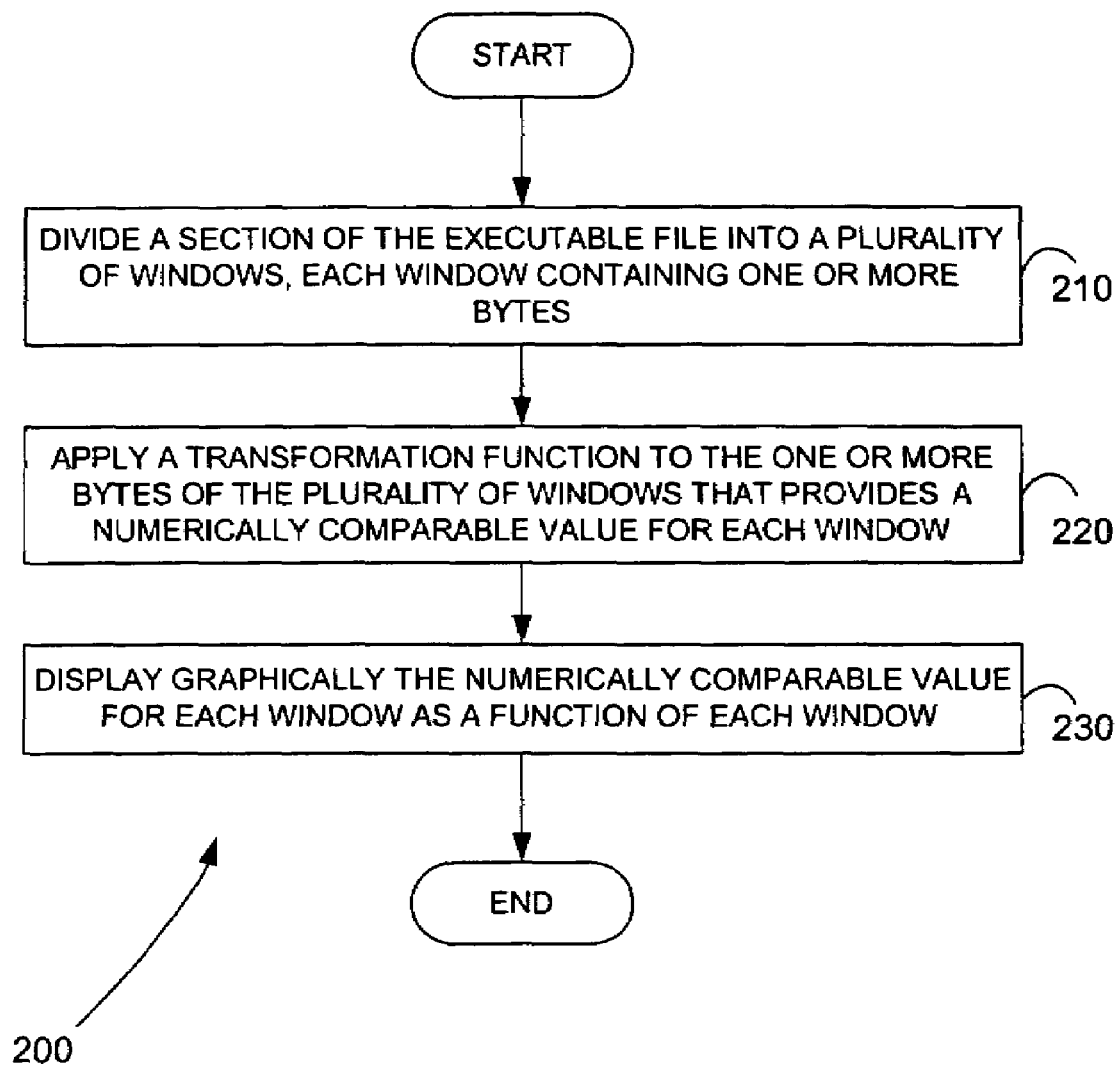
FIG. 2 is a flowchart showing a method for identifying malicious software in an executable file by graphically comparing a structural feature of the executable file across windows of bytes in a section of the executable file, in accordance with an embodiment of the present invention.

FIG. 2 is a flowchart showing a method 200 for identifying malicious software in an executable file by graphically comparing a structural feature of the executable file across windows of bytes in a section of the executable file, in accordance with an embodiment of the present invention.

In step 210 of method 200, a section of the executable file is divided into a plurality of windows, each window of the plurality of windows containing one or more bytes. In one embodiment of method 200, each window of the plurality of windows has substantially the same size or number of bytes.

In step 220, a transformation function is applied to the one or more bytes of the plurality of windows that provides a numerically comparable value for each window.

In step 230, the numerically comparable value for each window is displayed as a function of each window.

1. Byte-Type Views

Method 200 provides multiple ways to view structural features of an executable file, for example. One such view is a plot that allows an analyst to quickly see which regions of an executable file contain code, ASCII data, padding for alignment, or random byte values.

Figure 3:
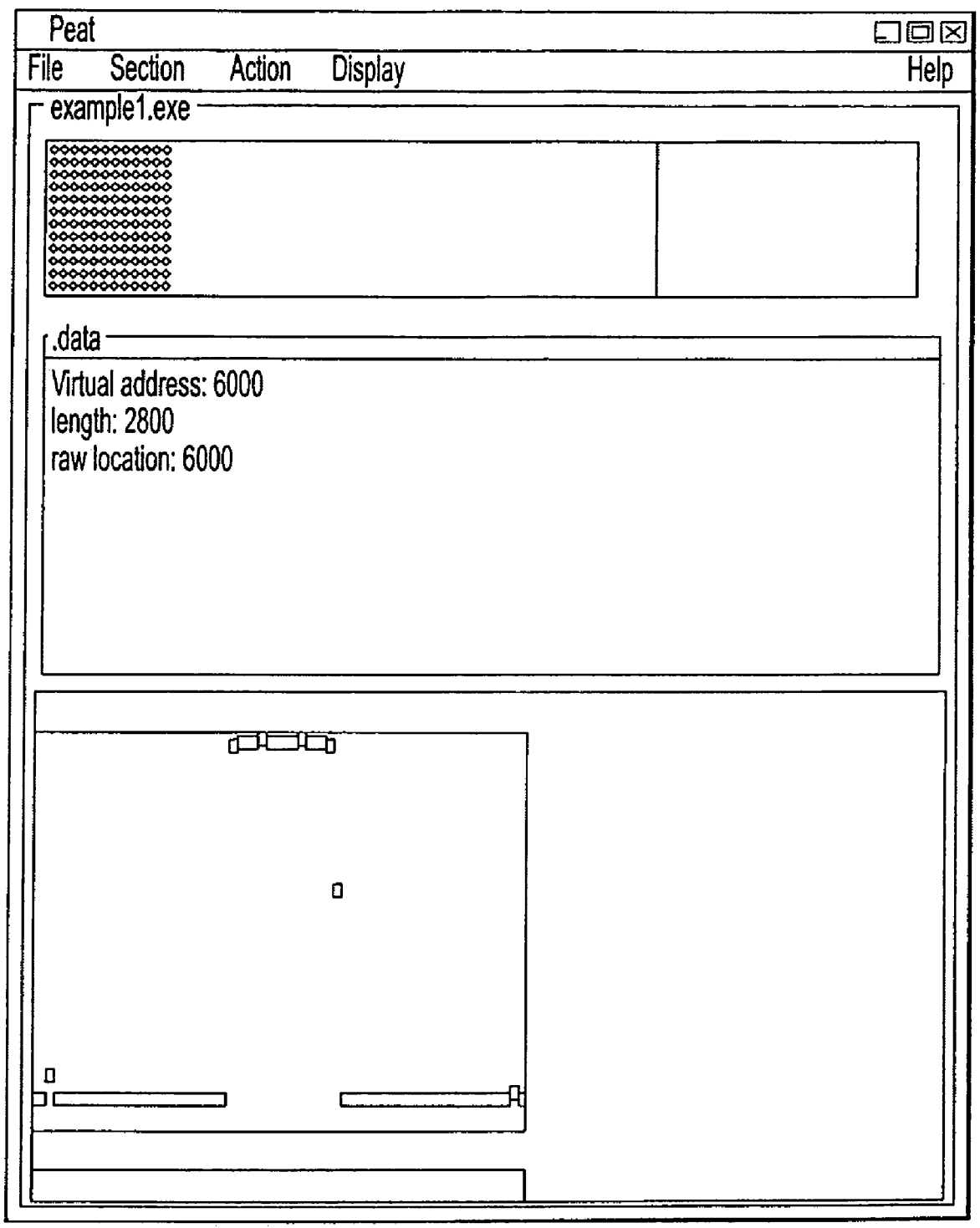
FIG. 3 is a graphical display of a byte-type view, in accordance with an embodiment of the present invention.

FIG. 3 is a graphical display of a byte-type view 300, in accordance with an embodiment of the present invention. For example, consider a .text segment of an infected MS WINDOWS™ portable executable (PE) file. Each point along the horizontal axis represents a window of bytes of the text segment, and its value along the vertical axis, scaled from 0 to 1, represents how likely the window of bytes consists of some byte-type of interest, with higher values indicating greater likelihood. An analyst can set the view so that code likelihood is displayed. A fairly solid line of points high on the vertical axis will indicate when the .text segment appears to contain real code.

The probability values are determined by standard statistical proportion tests in which the proportion of a certain set of byte values (i.e., values in the ASCII character range) observed in a window of bytes is computed. Based on the size of the window, the size of the set of target byte values, and the observed proportion of those target values, the probability, $p$, of drawing the observed byte values from a population of random byte values is computed. It is found by calculating $p=1-F(z)$ where $F$ is the cumulative distribution function of a standard normal random variable and $z=(x-ne)/(ne(1-e))^{1/2}$ where $n$ is the window size, $e$ is the expected proportion, and $x/n$ is the observed proportion. The complement of $p$ is plotted, so that higher values indicate greater likelihood that the window contains the byte-type of interest. In addition to these probabilities, the observed proportion of each of these byte-types is also available for viewing.

2. ASCII View

From the section-level view described above, the user may select a region to investigate further. One additional view is a display of the ASCII representation of each byte in the selected region. This view can be very helpful at helping the analyst identify plaintext portions of malicious software. For example, many viruses tote around plaintext ASCII messages within them such as "written by the Dark Avenger," and such text readily apparent to the analyst in this view.

3. Disassembly View

Method 200 provides another way to investigate a particular region of interest. Method 200 is capable of disassembling a region and displaying the results. For each instruction that is parsed, the address, raw byte values, instruction name, and the operands of the instruction are displayed. This is useful for analysts that are familiar with the instruction set of the underlying machine. This view allows analysts to look at the machine instructions as if they were in an assembly language source file and thus permits such analysts to identify instructions that are typical in malware.

4. Memory Access via Register Offsets

Method 200 provides a view that allows the user to see whenever memory is accessed by way of adding an offset to a particular register to calculate the address in memory that is accessed. The user first chooses a register to consider. For example, on MS WINDOWS™ machines, such a register may be the base pointer register EBP. Method 200 then uses the disassembly information to find and plot all such memory accesses. In the display created by method 200, there is a horizontal line through the middle of the vertical axis representing 0, and positive and negative offsets are plotted against this. This view can be used to visually assess whether some region uses this means of accessing memory differently from other regions (i.e., larger offsets, more frequent offsets, or offsets in opposite directions).

Figure 4:
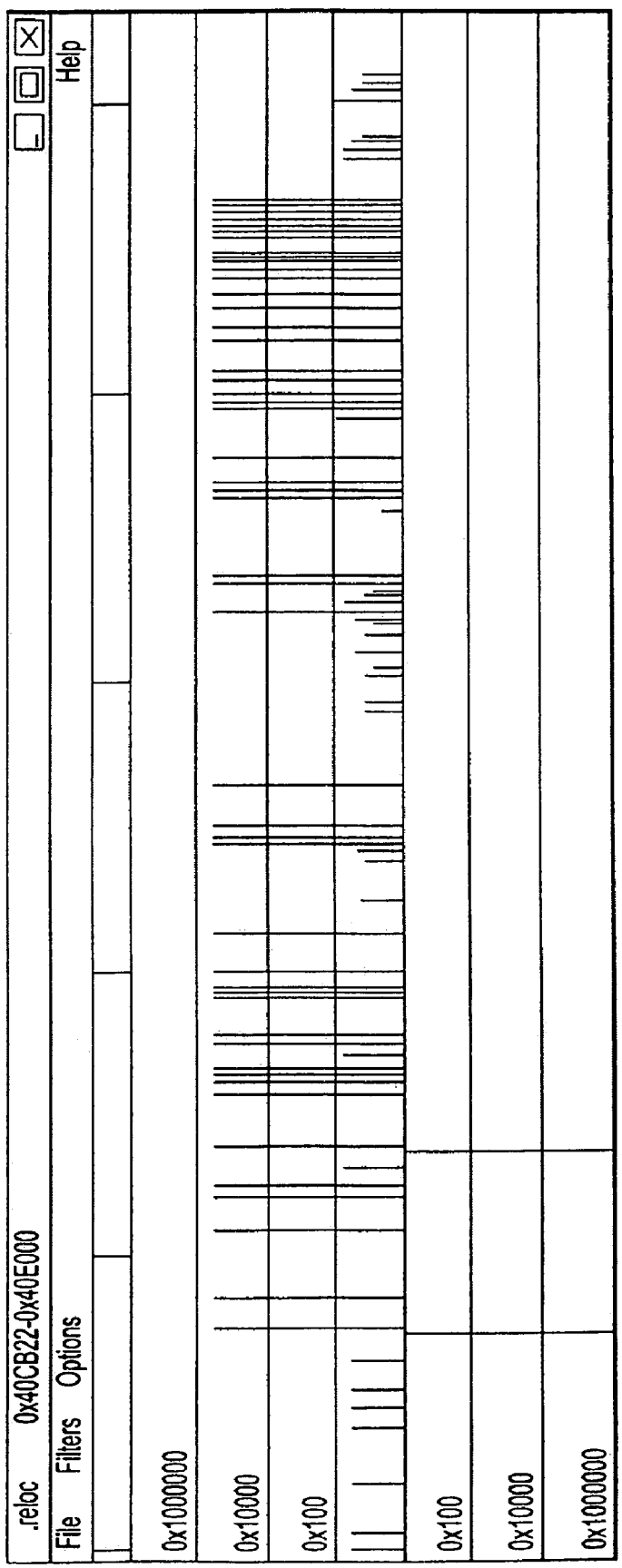
FIG. 4 is a graphical display of a register offset view, in accordance with an embodiment of the present invention.

FIG. 4 is a graphical display of a register offset view 400, in accordance with an embodiment of the present invention.

5. Other Views

Another view that method 200 provides displays offsets for jump and call instructions, similar to the view of register offsets, in order to visually determine whether regions are fairly self-contained or whether large jumps are made, such as to outside the boundaries of the executing segment. Yet another view displays common instruction patterns, such as several pushes followed by call (indicating the pushing of arguments onto the stack in order to make a procedure call). Method 200, therefore, allows the analyst to visually note the presence or absence of these common patterns and determine whether any region of the section appears to be different from the others, or a graphical outlier.

C. Statistical Analysis

Figure 5:
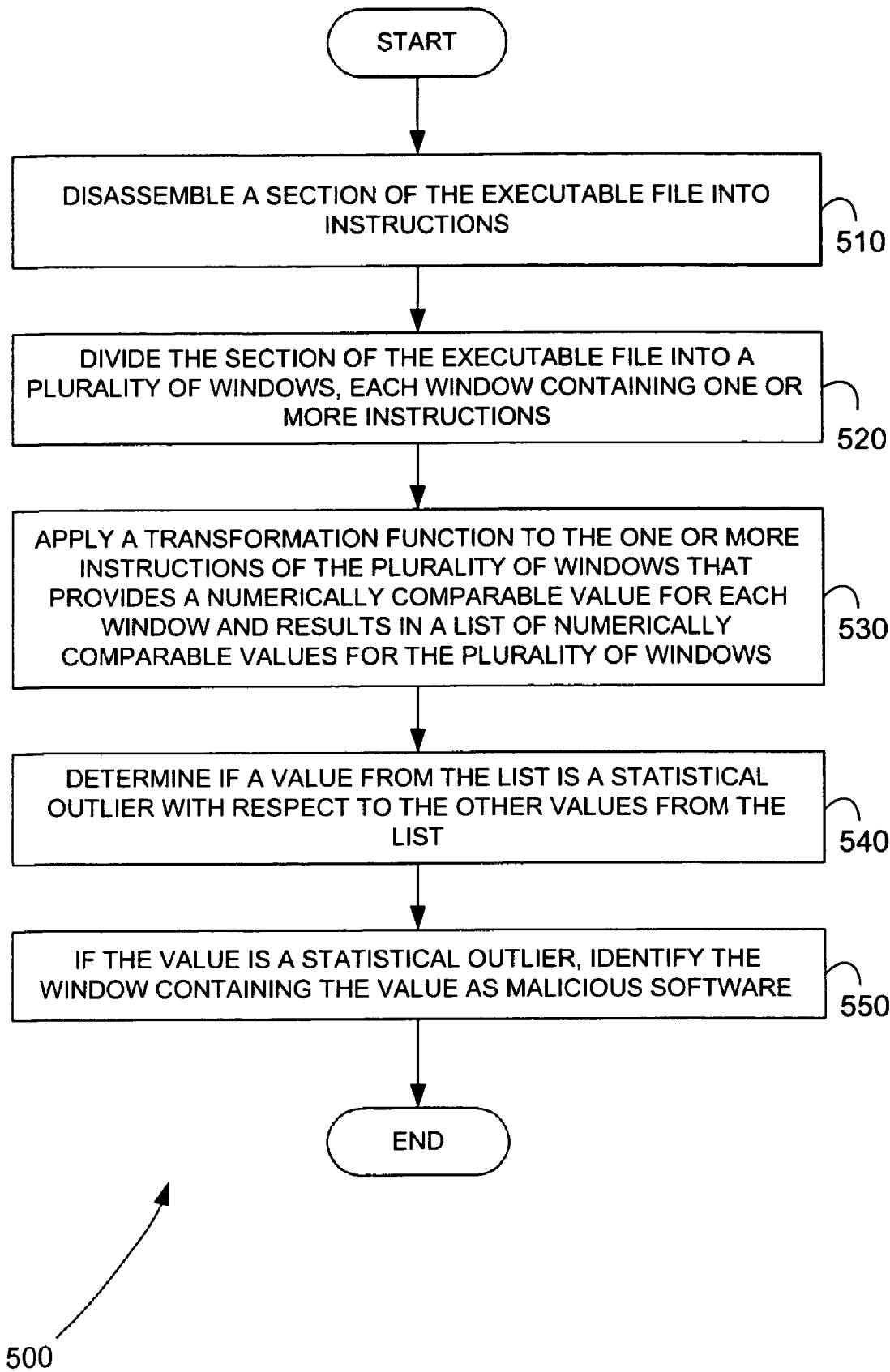
FIG. 5 is a flowchart showing a method for identifying malicious software in an executable file by statistically comparing a structural feature of the executable file across windows of instructions in a section of the executable file, in accordance with an embodiment of the present invention.

FIG. 5 is a flowchart showing a method 500 for identifying malicious software in an executable file by statistically comparing a structural feature of the executable file across windows of instructions in a section of the executable file, in accordance with an embodiment of the present invention.

In step 510 of method 500, a section of the executable file is dissembled into instructions.

In step 520, the section of the executable file is divided into a plurality of windows, each window of the plurality of windows containing one or more instructions. In one embodiment of method 500, each window of the plurality of windows has substantially the same size or number of instructions.

In step 530, a transformation function is applied to the one or more instructions of the plurality of windows that provides a numerically comparable value for each window and results in a list of numerically comparable values for the plurality of windows.

In step 540, it is determined if a value from the list of numerically comparable values is a statistical outlier with respect to other values from the list.

In step 550, if the value is a statistical outlier, the window containing the value is identified as containing malicious software.

Method 500 provides analysis capabilities based on using statistical methods for identifying anomalous regions within an executable file. The user may choose from a wide range of features to extract from the program, such as: instruction frequencies, instruction patterns, register offsets, jump and call offsets, entropy of opcode values, and code and ASCII probabilities.

When method 500 performs its automated analysis, it iterates over each section of the executable file. The section is disassembled into instructions, and then divided into n consecutive disjoint windows of a fixed number of instructions. The metric of interest for each window is computed (i.e., entropy of opcode values), yielding a list of values $X=(x_1, x_2, \ldots, x_n)$. From this list, another list of differences $Y=(y_1, y_2, \ldots, Y_{n-1})$ is computed, where $y_i = x_{i+1} - x_i$.

Next, method 500 iterates over the windows and determines for each window whether the corresponding data point in X is a statistical outlier with respect to the remaining data points in X. For window i, the mean and standard deviation of $X/x_i$ is computed, and it is determined whether $x_i$ lies within two standard deviations of the mean. Anytime this is not the case, the window will be reported as anomalous, along with a probability reflecting the likelihood of realizing a value at least as deviant as $x_i$ from the remaining empirical distribution. This procedure yields a list of windows that have, for example, anomalous entropy, with respect to the other windows in the section.

A similar procedure is applied to the windows with respect to the Y data points, yielding a list of windows that exhibit a significant sequential change in the metric of interest. For example, if common instruction patterns have been observed up to some point in the section, and then all of a sudden disappear, this will be reported by method 500. The reasoning behind using both the X and Y points is that the X points may be insufficient to find an anomalous region in a section whose first half, for example, is normal, while its entire second half has been overwritten with malicious code.

Given this general framework for statistical analysis, method 500 provides several different metrics from which it builds a set of criteria for anomaly detection, for example:

1. Instruction Frequencies

The idea behind examining instruction frequencies from window to window stems from one of our more fundamental premises that viruses tend to be written in assembly language while the host applications tend to be compiled from high-level languages. A study was performed based on this premise to identify any instructions that appear frequently in assembly language programs and rarely in compiled code, and similarly, instructions that appear frequently in compiled code and rarely in assembly language. The results of this study led to the lists of instructions whose frequencies are calculated for the purpose of finding anomalous windows. Ideally, malicious assembled code that has been injected into a section of an executable file will be discovered during the statistical analysis due to a sudden absence of frequent compiled code instructions, and further analysis could verify that assembly language instructions are abnormally frequent in that region.

2. Instruction Patterns

The motivation for examining patterns of instructions is very similar to the ideas behind examining instruction frequencies. The premise is that compiled code is likely to exhibit regular instruction sequences to implement common constructs like function calls and returns and looping constructs. An assembly language programmer's conventions for implementing these are not necessarily the same as the compiler, and perhaps not even consistent from use to use. An initial study of assembly language output from the Microsoft™ VISUAL C++™ compiler was performed and a list of patterns that are seen to result from the use of common high-level language constructs was built. The frequencies of the patterns are one metric that the user can choose to incorporate into an analysis with the goal being to discover injected malicious assembly language code via the sudden absence of such patterns.

3. Memory Access via Register Offsets

Another premise is that normal applications and malicious code will each use certain registers differently. In particular, the base pointer register EBP is commonly used by normal MS WINDOWS™ applications as a reference point for accessing local variables on the stack. Malicious programs, however, can take advantage of this key reference point to determine where they are in memory, a commonly necessary piece of information for them to function and adjust as they spread throughout unknown executables. Thus register-offset values used when accessing memory via a register are another metric that can be used during statistical analysis.

4. Jump and Call Distances

The common layout of an application compiled from a high-level language is simply a sequence of self-contained functions. Control flows between these functions via the CALL and RET instructions on MS WINDOWS™ machines. Jump instructions alter the control flow within a single function, implementing high-level conditional constructs such as if statements and while loops. Therefore, the distances traveled during a normal application's jump instructions should be relatively small and regular, and similarly, the distances traveled during call instructions should be relatively larger and regular. What should very rarely be observed in normal applications are extremely large jump or call distances, such as to other sections of an executable file.

5. Byte-Type Probabilities

The last types of information that method 500 uses as input to the statistical analysis are the probabilities that windows consist of ASCII data, padding, or real code. This is the same information that is presented in the section view display. In conjunction with the other metrics, this byte-type information can aid in the further investigation of regions that are marked as anomalous. For example, if a window is marked as an outlier for having a sudden absence of common instruction patterns, but it is also marked as an outlier for having a sudden high probability of being padding and low probability of being code, the analyst can more confidently conclude that the absence of patterns does not indicate the presence of assembly language code but rather the absence of code altogether.

When the entire automated analysis completes, method 500 presents to the analyst a list of windows that were found to be anomalous. Each is reported along with its location in the section and a description of what characteristics made it stand out. From this list, the analyst can easily invoke the visualization options of method 200, such as the disassembly, in order to further investigate some particular region. It is clear to those skilled in the art that these windows and visualization tools can be automated so as to not require a human observer in order to decide the presence or absence of malware. For instance, a window that displays the entropy of bytes can just as easily be coded as a function that looks for entropy that is above a certain threshold. When a window of bytes (i.e., 100 bytes) exhibits a high level of entropy (i.e., Shannon information content) the tool indicates it as an unusually high entropy region. The tool therefore automatically concludes that this region may contain a compressed or encrypted string that is characteristic of polymorphic viruses.

II. Detection of Symmetric Decryption Code

One of the primary methods for designing malicious software to evade detection is by employing cryptography. A number of real-world viruses employ simple encryption algorithms to encrypt the bulk of their code. This makes analyzing the true nature of the malware difficult, since the symmetric key used in the encryption needs to be used to decipher the body. Viruses that employ this method typically change the key at frequent intervals, thereby making the ciphertext vary often (usually there is a randomly chosen key for each viral offspring). Worms and Trojan horses also benefit from using cryptography to achieve code obfuscation.

Malware can utilize encryption and decryption for reasons other than code obfuscation. For example, malware that steals passwords or other sensitive information can encrypt it and potentially decrypt it at a later time for use. In this sense, the malware is utilizing cryptography in a standard fashion.

Fortunately, malicious software designers have a habit of employing relatively simplistic encryption algorithms. Such forms of malicious software can be detected heuristically by searching for the decryption algorithms they employ to convert the ciphertext of the malware back into plaintext at runtime.

Figure 6:
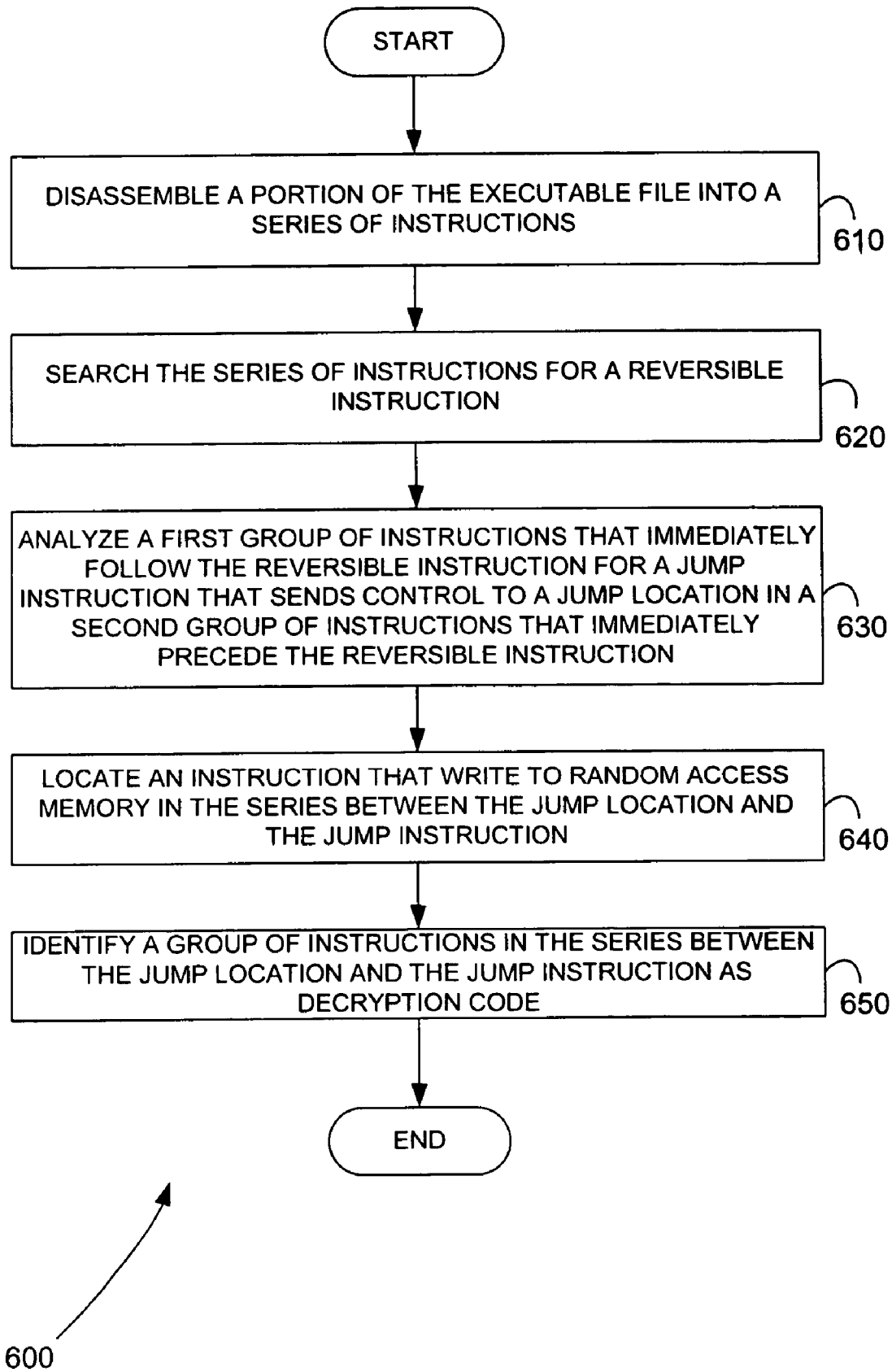
FIG. 6 is a flowchart showing a method for identifying decryption code in an executable file, in accordance with an embodiment of the present invention.

FIG. 6 is a flowchart showing a method 600 for identifying decryption code in an executable file, in accordance with an embodiment of the present invention.

In step 610 of method 600, a portion of the executable file is disassembled into a series of instructions.

In step 620, the series of instructions is searched for a reversible instruction. A reversible instruction is one that when run twice on data, modify the data and then restores it to its original value. This includes but is not limited to rotates, exclusive-or operations, and byte swaps. Note that both the opcode and its operands are analyzed for constituting a reversible instruction. For example, "xor al,al" is not a reversible instruction.

In step 630, a first group of instructions that immediately follow the reversible instruction is analyzed for a jump instruction that sends control to a jump location in a second group of instructions that immediately precede the reversible instruction. The maximum number of instructions that are checked for the jump can be specified using an integer constant. The maximum number of instructions before the invertible instruction which are analyzed for being valid entry points of the jump can also dictated by a constant. Ideally these constants can be set to relatively small values to look for "tight" loops. Doing this avoids a high false-positive rate.

In step 640, an instruction that writes to random access memory is located in the series of instructions between the jump location and the jump instruction. On the INTEL™ Processor, for example, these instructions are of the form:

inst [xxxxx],yyyyy inst [xxxxx]

In INTEL™ architectures, this can be implemented by analyzing the modem byte of the instruction. The heuristic will reject potential decryption loops that do not contain an instruction of this form. Also, certain instructions have destination operands in memory but which do not modify RAM. For example, on the INTEL™ PENTIUM™ processor the following instruction does not modify RAM.

cmp [ax],bx

Also, certain instructions are not likely to be direct indicators of decryption loops. For example, on the PENTIUM™ the following instruction is not a strong indicator that decryption is occurring, even though it modifies memory.

push [ax]

In step 650, a group of instructions in the series between the jump location and the jump instruction is identified as decryption code.

In summary, method 600 looks for tight loops that contain an invertible instruction in their body and that also contain a write to memory. The reason that the heuristic does not check for reads from memory is as follows. Consider the following INTEL™ instruction:

xor [ax],53h

This is an invertible instruction that does not read from memory, but that is effective at obfuscating code. It is emphasized that method 600 applies equally well to other machine architectures such as the Motorola™ processors. Method 600 also applies to virtual machines such as the Java™ virtual machine. Finally, method 600 applies to intermediate machine-independent languages such as those that are output by high-level language compilers that have yet to be translated into a particular assembly language.

III. Detection of Standardized Symmetric Ciphers

Malicious software designers also benefit from deploying malware that utilizes strong cryptography. Strong cryptography uses a cryptographic function. Cryptographic functions include but are not limited to ciphers and hashes. Examples of strong symmetric ciphers include the Data Encryption Standard and more recently the Advanced Encryption Standard. The reasons for using strong cryptography are straightforward. It provides higher security assurances for whatever is being encrypted. Typical malware designers are not cryptographers nor cryptanalysts, and as such may not trust themselves to design secure ciphers from the ground up. Ciphers are published and standardized to eliminate the need for programmers to design their own cryptographic algorithms. For this reason it makes sense to design heuristics to detect malware that utilizes published or standardized ciphers. In this section a method is given for detecting such well-known ciphers.

The fastest known symmetric ciphers that are easy to use are Feistel ciphers. These ciphers do not employ provable security in the sense of reduction arguments from problems believed to be computationally intractable. Yet, they are typically believed to be secure due to the fact that they have withstood the test of time. They utilize the notion of confusion and diffusion that is applied over the coarse of several iterations, i.e., 32. The process is fueled by a key schedule that is based on the symmetric key that the user inputs.

The Feistel transformations often utilize numeric constants called S-Boxes and P-Boxes, which stand for Substitution Boxes and Permutation Boxes, respectively. Choosing these constants arbitrarily can be perilous since it may give rise to weak implementations that are vulnerable to Differential Cryptanalysis, for instance. As a result programmers should ideally not touch these constants, but they are of course free to do so. However, by doing so they run the risk of introducing cryptanalytic vulnerabilities as well as the obvious incompatibility issues. The fact that these constants are needed to perform decryption makes for a solid decryption algorithm detection heuristic.

Figure 7:
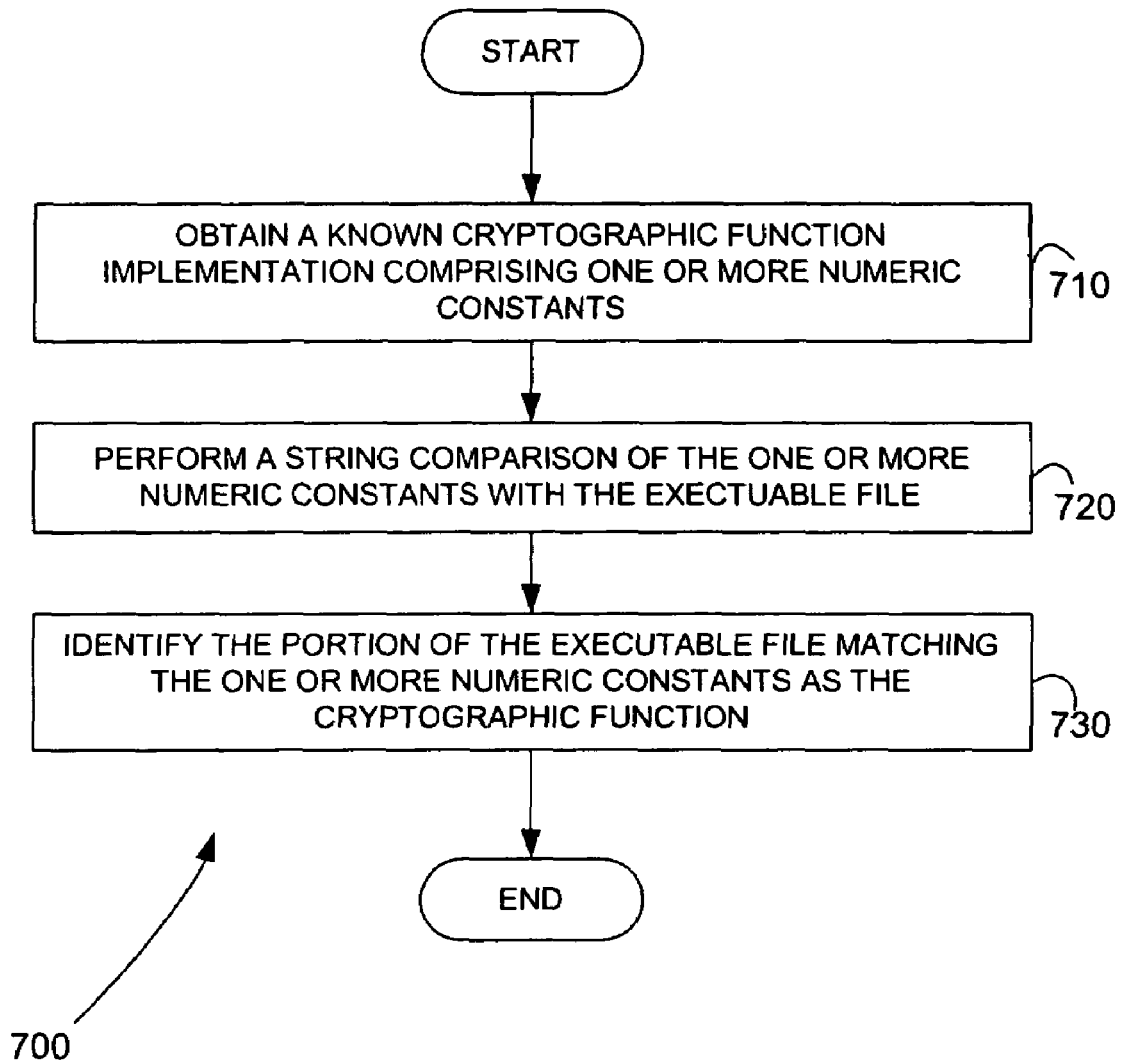
FIG. 7 is a flowchart showing a method for identifying a cryptographic function in an executable file, in accordance with an embodiment of the present invention.

FIG. 7 is a flowchart showing a method 700 for identifying a cryptographic function in an executable file, in accordance with an embodiment of the present invention.

In step 710 of method 700, a known cryptographic function implementation containing one or more numeric constants is obtained. Consider the publicly known cipher C. All readily obtainable implementations of C are obtained and they are analyzed for commonalities. Some may be coded in a straightforward way to make the code readable. This may be the case for instructional (i.e., academic) implementations. Some may be coded to minimize the running time. Some may be coded to make the resulting code be as compact as possible. The implementations are arranged into equivalence classes. An equivalence class is defined as a class of implementations that share at least 32 or more bits of commonality regarding S-Box and P-Box constants. The heuristic is coded based on taking these common constants from each equivalence class.

In step 720, a string comparison of the one or more numeric constants with the executable file is performed. For each constant or set of constants in each equivalence class, the heuristic performs string matching on the input executable.

In step 730, the portion of the executable file matching of the one or more numeric constants is identified as the cryptographic function. If the constants are found to be present, then the method halts and outputs TRUE. If not it halts and outputs FALSE. The method is then reapplied using the constants from the next equivalence class. Method 700 terminates when all equivalence classes have been utilized.

Method 700 is best described by a concrete example. It was found that two different Data Encryption Standard (DES) implementations utilized the following four 32-bit P-Box constants.

0x0f0f0f0f
0x0000ffff
0x33333333
0x00ff00ff

These values appeared in the code in close proximity with each other and in the same order. It was found that three other implementations all implemented the substitution boxes the same way. They contained the following array as defined in the ANSI C programming language.

static final char DESSBox[]={14, 4, 13, 1, 2, 15, 11, 8, 3, 10, 6, 12, 5, 9, 0, 7, 0, 15, 7, 4, 14, 2, 13, 1, 10, 6, 12, 11, 9, 5, 3, 8, 4, 1, 14, 8, 13, 6, 2, 11, 15, 12, 9, 7, 3, 10, 5, 0, 15, 12, 8, 2, 4, 9, 1, 7, 5, 11, 3, 14, 10, 0, 6, 13};

When given an input executable program, the method looks for the four 32-bit P-Box constants as well as the bytes corresponding to the DESSBox array. To account for big-endian/little-endian orderings, these constants are searched for using string matching from left to right and then from right to left. Method 700 returns true if and only if a match occurs In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (i.e., machine code) by a processor, or require further manipulation (i.e., compilation, decryption, or provided with an access code) to be ready to be executed by a processor.

Methods in accordance with an embodiment of the present invention disclosed herein can advantageously improve malicious software detection by providing a skilled antiviral analyst with a useful tool that can identify an attack using at least three different types of heuristics. These three heuristics are the detection of inhomogeneous code structures, the presence of tight loops around instructions that perform invertible data transformations and that modify RAM, and discovery of known symmetric ciphers within a host program.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for identifying malicious software in an executable file, comprising:
   dividing a portion of the executable file into a plurality of windows, each window of the plurality of windows comprising one or more bytes;
   applying to the one or more bytes of the plurality of windows a transformation function that provides a numerically comparable value for the each window;
   displaying graphically the numerically comparable value for the each window as a function of the each window;
   determining if a given numerical comparable value is a statistical outlier with respect to other numerical comparable values; and
   if the given numerical comparable value is a statistical outlier, identifying a window comprising the given numerical comparable value as the malicious software,
   wherein the statistical outlier has a value two standard deviations greater than the mean of the numerical comparable values.

2. The method of claim 1, wherein each of the plurality of windows is the same size.

3. The method of claim 1, wherein the transformation function comprises:
   calculating a number of bytes in the each window that match a target byte-type; and
   using the number of bytes as the numerically comparable value.

4. The method of claim 3, wherein the target byte-type comprises one of code, ASCII data, padding for alignment, and random byte values.

5. The method of claim 1, wherein the transformation function comprises:
   calculating a probability that the bytes in the each window are of a target byte-type; and
   using the probability as the numerically comparable value.

6. The method of claim 5, wherein the target byte-type comprises one of code, ASCII data, padding for alignment, and random byte values.

7. The method of claim 1, wherein the transformation function comprises:
- selecting a register;
- disassembling the one or more bytes of the each window;
- locating an offset to the register in the each window; and
- using the offset as the numerically comparable value.

8. The method of claim 1, wherein the transformation function comprises:
- disassembling the one or more bytes of the each window;
- locating an offset for one of a jump instruction and a call instruction in the each window; and
- using the offset as the numerically comparable value.

9. The method of claim 1, wherein the transformation function comprises:
- selecting an instruction pattern;
- disassembling the one or more bytes of the each window;
- counting a number of occurrences of the instruction pattern in the each window; and
- using the number as the numerically comparable value.

10. The method of claim 1, further comprising displaying an ASCII representation of the one or more bytes of the each window.

11. The method of claim 1, further comprising displaying a disassembled representation of the one or more bytes of the each window.

12. The method of claim 1, further comprising searching a plurality of graphically displayed numerically comparable values for an outlier and identifying the outlier as the malicious software.

13. The method of claim 1, further comprising:
- applying to the one or more bytes of the plurality of windows a transformation function that provides two or more numerically comparable values for the each window; and
- displaying graphically the numerically comparable values for the each window as a function of the each window.

14. A method for identifying malicious software in an executable file, comprising:
- disassembling a portion of the executable file into instructions;
- dividing the portion into a plurality of windows, each window of the plurality of windows comprising one or more instructions;
- applying to the one or more instructions of the plurality of windows a transformation function that provides a numerically comparable value for the each window and results in a list of numerically comparable values for the plurality of windows;
- determining if a value from the list is a statistical outlier with respect to other values from the list; and
- if the value is a statistical outlier, identifying a window comprising the value as the malicious software,
- wherein the statistical outlier has a value two standard deviations greater than the mean of the list.

15. The method of claim 14, wherein each of the plurality of windows is the same size.

16. The method of claim 14, wherein the transformation function comprises:
- calculating a number of bytes in the each window that match a target byte-type; and
- using the number of bytes as the numerically comparable value.

17. The method of claim 16, wherein the target byte-type comprises one of code, ASCII data, padding for alignment, and random byte values.

18. The method of claim 14, wherein the transformation function comprises:
- calculating a probability that the bytes in the each window are of a target byte-type; and
- using the probability as the numerically comparable value.

19. The method of claim 18, wherein the target byte-type comprises one of code, ASCII data, padding for alignment, and random byte values.

20. The method of claim 14, wherein the transformation function comprises:
- selecting a register;
- locating an offset to the register in the each window; and
- using the offset as the numerically comparable value.

21. The method of claim 14, wherein the transformation function comprises:
- locating an offset for one of a jump instruction and a call instruction in the each window; and
- using the offset as the numerically comparable value.

22. The method of claim 14, wherein the transformation function comprises:
- selecting one or more instructions;
- counting a number of occurrences of the one or more instructions in the each window; and
- using the number as the numerically comparable value.

23. The method of claim 14, wherein the transformation function comprises:
- selecting an instruction pattern;
- counting a number of occurrences of the instruction pattern in the each window; and
- using the number as the numerically comparable value.

24. The method of claim 14, further comprising
- creating a second list of difference values by calculating the difference between adjacent values in the list;
- determining if a difference value from the second list is a statistical outlier with respect to other difference values from the second list; and
- issuing a warning if the difference value is a statistical outlier.

25. A method for identifying malicious software in an executable file, comprising:
- dividing a portion of the executable file into a plurality of windows, each window containing one or more bytes;
- applying to the one or more bytes in the plurality of windows a transformation function that provides a numerically comparable value for the each window;
- using information resulting from the applying a transformation function to compute a probability that a given one of the one or more bytes is malicious software
- determining if a given numerical comparable value is a statistical outlier with respect to other numerical comparable values; and
- if the given numerical comparable value is a statistical outlier, identifying a window comprising the given numerical comparable value as the malicious software,
- wherein the statistical outlier has a value two standard deviations greater than the mean of the numerical comparable values.

* * * * *